United States Patent [19]

Kinoshita et al.

[11] Patent Number: 5,404,203
[45] Date of Patent: Apr. 4, 1995

[54] IMAGE FORMING APPARATUS INCLUDING IMAGE FORMING CONDITION CORRECTION ARRANGEMENT AND METHOD FOR CORRECTING IMAGE FORMING CONDITION IN IMAGE FORMING APPARATUS

[75] Inventors: Takeru Kinoshita; Takanobu Yamada, both of Toyokawa, Japan

[73] Assignee: Minolta Camera Kabushiki Kaisha, Osaka, Japan

[21] Appl. No.: 128,224

[22] Filed: Sep. 29, 1993

[30] Foreign Application Priority Data

Oct. 5, 1992 [JP] Japan .................. 4-265871

[51] Int. Cl.$^6$ ............................................. G03G 21/00
[52] U.S. Cl. ....................................... 355/208; 355/225; 355/246
[58] Field of Search ................ 355/203, 204, 208, 210, 355/214, 219, 221, 225, 228, 246; 250/324–326

[56] References Cited

U.S. PATENT DOCUMENTS

| | | | |
|---|---|---|---|
| 3,788,739 | 1/1974 | Coriale | 355/210 |
| 4,355,885 | 10/1982 | Nagashima et al. | 355/208 |
| 4,377,338 | 3/1983 | Ernst | 355/246 |
| 4,583,839 | 4/1986 | Suzuki | 355/246 |
| 4,816,863 | 3/1989 | Lee | 355/208 |
| 4,894,685 | 1/1990 | Shoji | 355/246 |
| 5,274,424 | 12/1993 | Hattori et al. | 355/208 |

*Primary Examiner*—William J. Royer
*Attorney, Agent, or Firm*—Burns, Doane, Swecker & Mathis

[57] ABSTRACT

In an image-forming apparatus by using electrophotographic process, a method for stabilizing an image is provided. First, a photoconductor is sensitized with a prescribed standard sensitizing potential, and the surface potential thereof is detected. Then, the standard sensitizing potential is corrected according to the detected potential. Next, latent image patterns are formed with a plurality of light-emitting powers on a photoconductor which has been sensitized with the corrected prescribed standard potential, and the surface potentials thereof are detected. Thus, a relation between the light-emitting power and the surface potential is obtained directly. Then, the light-emitting power is determined which realizes the detected surface potential nearest to the object potential. Next, a standard toner image is formed for automatic image density control by using the corrected sensitizing potential and the selected light-emitting power.

15 Claims, 17 Drawing Sheets

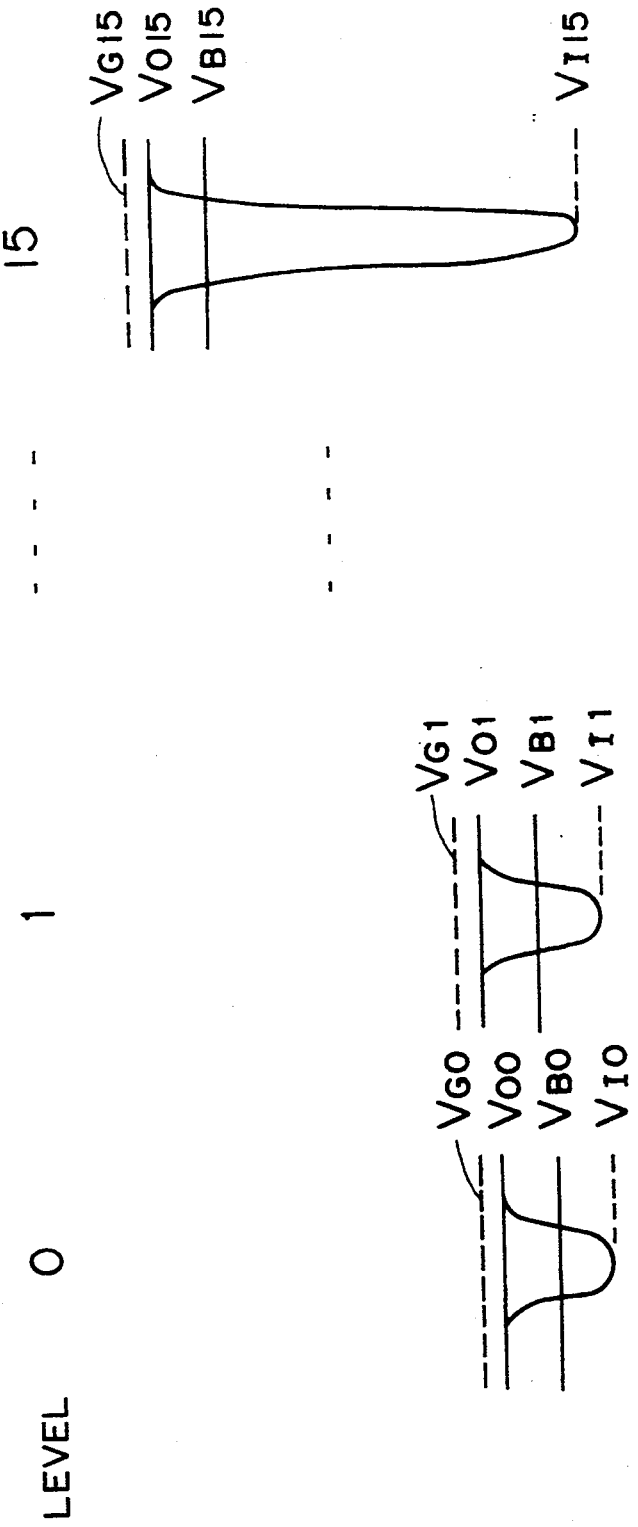

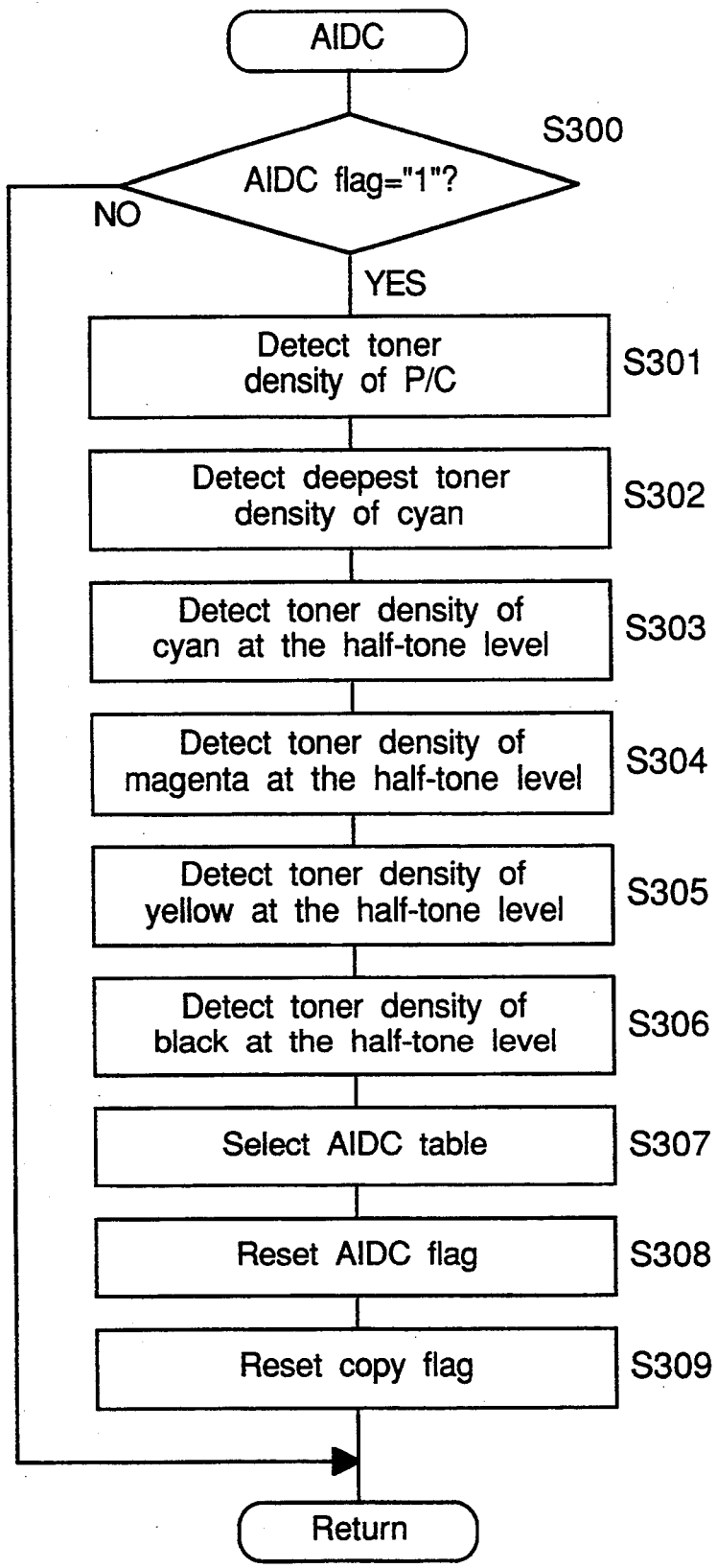

IMAGE FORMING APPARATUS INCLUDING IMAGE FORMING CONDITION CORRECTION ARRANGEMENT AND METHOD FOR CORRECTING IMAGE FORMING CONDITION IN IMAGE FORMING APPARATUS

BACKGROUND OF THE INVENTION

1. Field of the Invention

The present invention relates to the stabilization of an image formed by an image forming apparatus such as a copying machine, a printer or the like.

2. Description of the Prior Art

In general, the electrostatic characteristic of a photoconductor used in electrophotographic process varies with environment and wear of a photoconductor on which a toner image is formed. Further, it also varies among photoconductors. Especially for a color image, such a change of electrostatic characteristic of photoconductor affects largely the reproduction of colors, the balance of colors and the reproduction at low densities.

Then, in order to stabilize the reproduction of an image, automatic image density control (AIDC) is performed before reproducing an image to determine image-forming conditions so as keep the image density stable. In the automatic image density control, a standard toner image for the automatic image density control is first formed at a half-tone level on the surface of the photoconductor, and the toner density of the standard toner image is measured by detecting the quantity of reflection light with a sensor arranged near the photoconductor. Then, image-forming conditions on reproducing an image such as the maximum quantity of exposure light, the surface potential, the gradation characteristic and the like are controlled according to the detected toner density. Further, in order to improve the precision of the above-mentioned control of the image-forming conditions, for example, the potential of an electrostatic latent image formed before the automatic image density control is measured, and the image-forming conditions for the standard toner image formed in the automatic image density control is adjusted for example on the surface potential, the quantity of light or the like.

In a method for adjusting the image-forming conditions on the automatic image density control, the surface potential of a portion to be exposed is corrected before the exposure, and the surface potential of the exposed portion is detected after exposing the portion at the standard quantity of light. Then, the maximum quantity of light is determined according to the relation between the detected value and the quantity of light. For example, in a copying machine, after a photoconductor is sensitized with a standard grid potential of a sensitizing charger, the surface potential of the photoconductor is detected and a correction amount of the surface potential is determined according to the detected value. Next, the surface potential is detected after the photoconductor is exposed with a standard quantity of light, and a corrected maximum quantity of light is determined according to a predetermined relation of the detected surface potential value with the quantity of light. Then, a standard toner image is formed in automatic image density control by using the grid potential and the maximum quantity of light both corrected as explained above, and the image-forming conditions such as the grid potential of the sensitizing charger, the development bias potential of a development unit and the gradation characteristic are determined according to the detected toner density of the standard toner image. Then, a copy action is carried out in the image-forming conditions determined by the automatic image density control. Such correction of image-forming conditions of a latent image in the automatic image density control improves the precision of the automatic image density control, so that the change in the sensitivity of the photoconductor due to environment or wear can be corrected to a certain degree.

In this method, in order to shorten a time needed to start up in a copying machine, the potential of a standard pattern prepared only at a quantity of light is measured before the automatic image density control. This method has an advantage that a time needed for detection is short and the start up time before the automatic image density control does not become long.

However, this method has a disadvantage that the correction may not become appropriate in some conditions. For example, if the grid potential of the sensitizing charger change from the value just after the initial correction due to environment such as high humidity, the surface potential which will be expected to be realized according to the automatic image density control cannot be obtained.

Further, in a multi-copy wherein copies are produced continuously, the potential of the photoconductor (especially after irradiated with light) may vary with the repetition of sensitizing and erasing of the photoconductor. In such a case, even if the surface potential is detected at a portion between latent images and the image-forming conditions are corrected according to the detected value, the correction precision is liable to become worse because the potential at the image forming is different from that measured for the correction.

In order to perform the automatic image density control precisely, it is desirable to keep the surface potential of a photoconductor before and after the exposure constant under any conditions for forming the standard toner image, so as to make the development voltage constant.

SUMMARY OF THE INVENTION

An object of the present invention is to provide a method for keeping image-forming conditions stable in an image forming apparatus by using electrophotographic process.

In one aspect of the present invention, in an image-forming apparatus by using electrophotographic process, before controlling the image-forming conditions with automatic image density control, image-forming conditions of a standard toner image formed in automatic image forming control are corrected. First, a latent image pattern is formed in a photoconductor, which has been sensitized by a sensitizing charger with a prescribed standard sensitizing potential, by exposing the photoconductor with a standard quantity of light. Then, the surface potential of the latent image pattern is detected with an electrometer, and the standard sensitizing potential is corrected according to the detected value by using a prescribed relation which has been determined beforehand. Thus, the standard sensitizing potential is corrected. Next, latent image patterns are formed on a photoconductor, which has been sensitized with the corrected standard sensitizing potential, by exposing the photoconductor with a plurality of quantities of light, and the surface potentials of the latent image patterns are detected with an electrometer. Thus, a relation is obtained directly between the surface potential and the quantity of light. By using the relation, a quantity of light which is nearest to the surface potential to be realized can be selected as the most appropriate quantity of exposure light used for automatic image density control. Thus, the exposure characteristic of the photoconductor is corrected. The automatic image density control can be performed by using the corrected sensitizing potential and the selected quantity of light.

In a second aspect of the present invention, if a relation between the sensitizing potential and the quantity of light is once known, the correction can be performed simply by using the relation. That is, an electrostatic latent image pattern is formed only for the selected quantity of light according to the relation, and the surface potential of the pattern is measured. If the potential measured at the present time for the selected quantity of exposure light is larger than the measured value measured at the last time, the maximum quantity of light is decreased, otherwise it is increased. The amount of the decrease or increase can be determined according to the above-mentioned relation between the surface potential and the quantity of light.

An advantage of the present invention is that the relation of the quantity of light and the surface potential of the sensitized photoconductor can be examined directly to correct the surface potential to have an object value so that the image reproduction is controlled stably according to any sensitivity change of the photoconductor due to environment, wear or the like.

Another advantage of the invention is that image-forming conditions can be corrected only by detecting the surface potential if the relation of the quantity of light with the surface potential is observed once.

A third advantage of the invention is that the image-forming conditions for forming a standard toner image in the automatic image density control can be set more precisely.

BRIEF DESCRIPTION OF THE DRAWINGS

These and other objects and features of the present invention will become clear from the following description taken in conjunction with the preferred embodiments thereof with reference to the accompanying drawings, and in which:

FIG. 6 is a diagram of a combination of grid potential $V_G$ and development bias potential $V_B$;

FIG. 17, which includes FIG. 18 is a flowchart of AIDC processing.

DETAILED DESCRIPTION OF THE PREFERRED EMBODIMENTS

Figure 1:
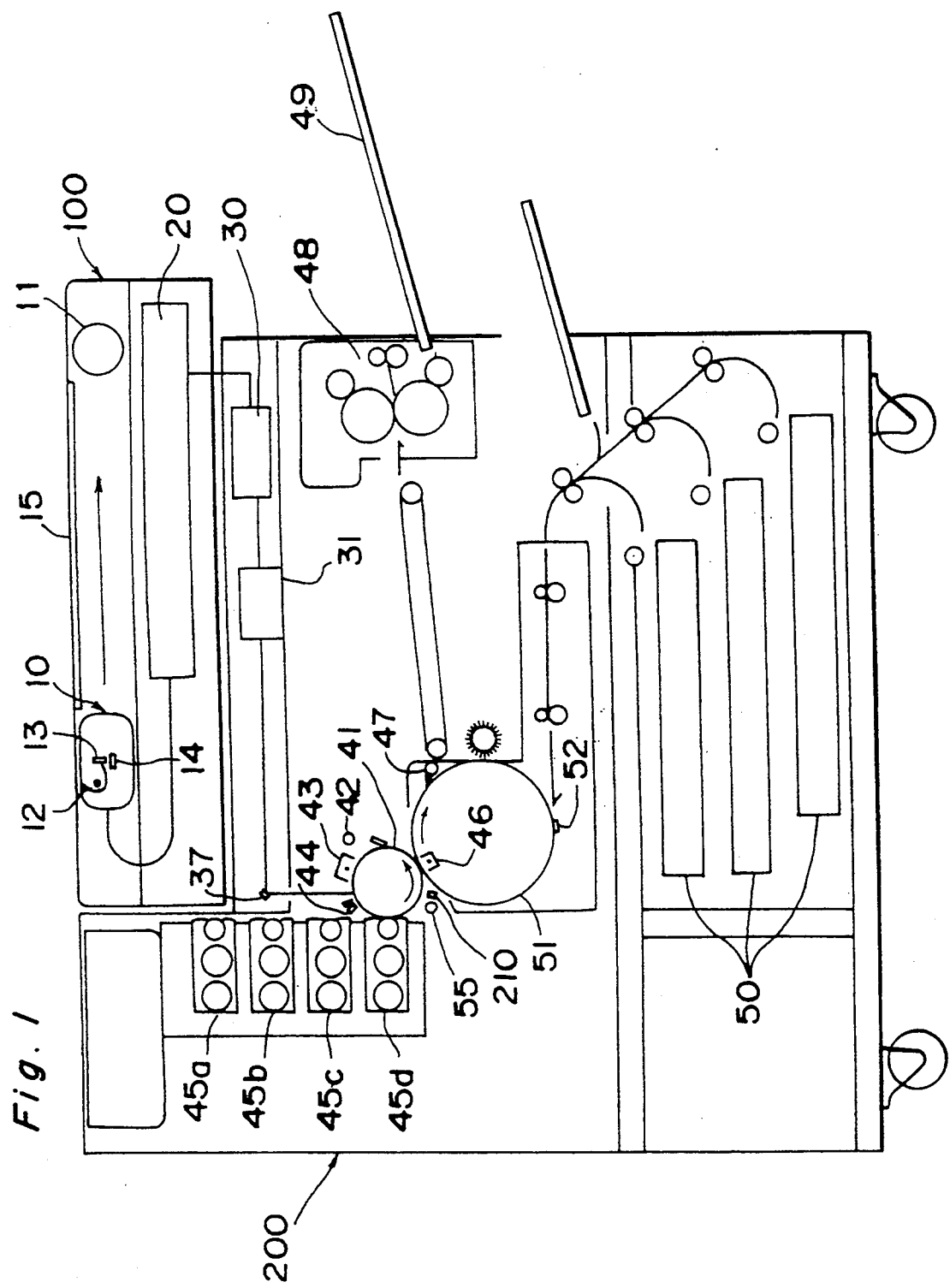
FIG. 1 is a sectional view of a full-color copying machine.

Referring now to the drawings, wherein like reference characters designate like or corresponding parts throughout the views, a digital color copying machine according to the present invention is explained by referring to the drawings, wherein like reference characters designate like or corresponding parts throughout the views.

(a) Structure of Digital Color Copying Machine

FIG. 1 shows a schematic structure of a digital color copying machine which consists mainly of an image reader 100 for reading a document image and a printer 200 for reproducing the document image. In the image reader 100, a scanner 10 includes an exposure lamp 12, a rod lens array 13 to collect reflection light from a document put on a platen 15 and a CCD color image sensor 14 to convert the collected light to an electric signal. The scanner 10 is driven by a motor 11 to move in the direction (subscan direction) of the arrow shown in FIG. 1. The optical image of the document illuminated by the exposure lamp 12 is converted by the image sensor 14 into a multi-level electric signal of red (R), green (G) and blue (B). The electric signal is converted by an image signal. processor 20 to 8-bit gradation data of yellow (Y), magenta (M), cyan (C) and black (K), which are stored in a buffer memory 30 for synchronization.

Figure 2A:
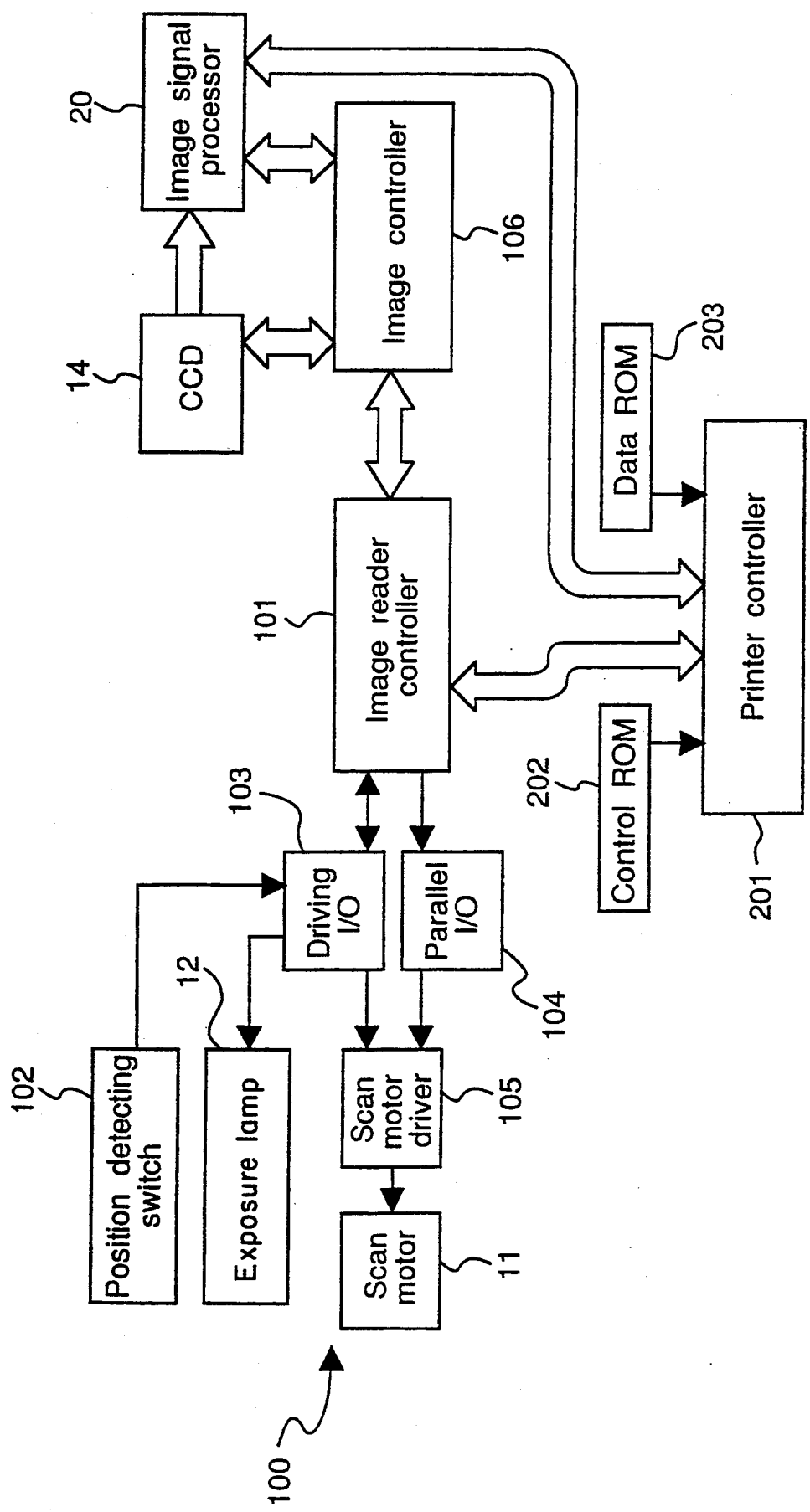
FIGS. 2(a) and 2(b) are each a part of a block diagram of the control system of the copying machine.
Figure 2B:
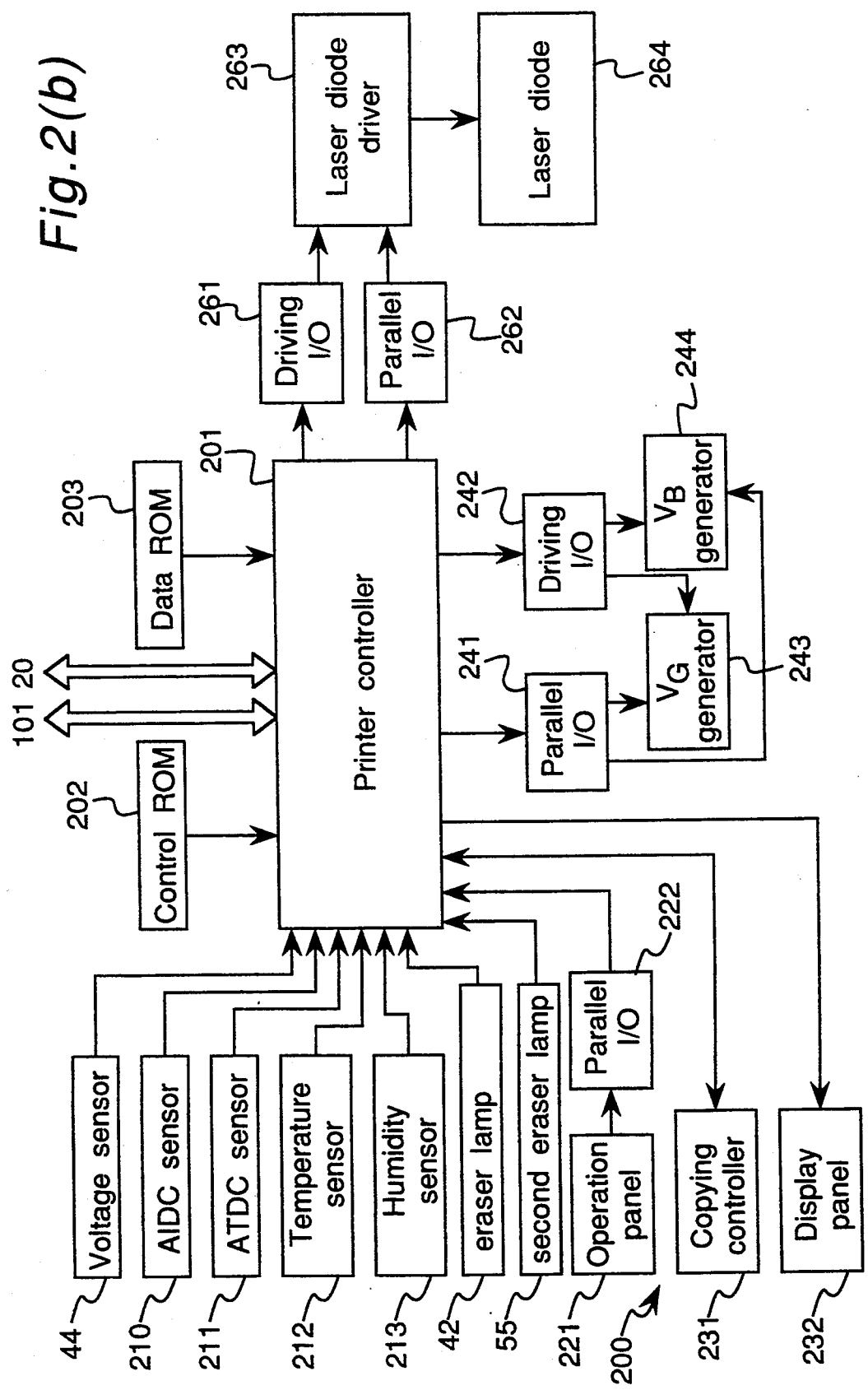

Then, in the printer 200, a print head 31 performs the gradation correction (gamma correction) of the receive gradation data and it converts the corrected image data to a drive signal to drive a laser diode 264 (refer FIG. 2(b)) in the print head 31.

A laser beam emitted from the print head 31 according to the gradation data exposes a photoconductor drum 41 driven to be rotated, via a reflection mirror 37. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of development units 45a–45d with yellow, magenta, cyan and black toners is selected to develop the latent image. Then, a second eraser 55 located before a transfer charger 46 discharges the photoconductor. The developed toner image is transferred by a transfer charger 46 to a paper wound on a transfer drum 51.

The above-mentioned printing process is repeated four times for yellow, magenta, cyan and black. At this time, the scanner 10 repeats the scanning in synchronization with the motion of the photoconductor drum 41 and the transfer drum 51. Then, the paper is isolated from the transfer drum 51 with the operation of an isolation claw 47, the image is fixed by a fixing unit 48 and the paper is carried out to a paper tray 49. In this process, a paper is supplied from a paper cassette 50 and is chucked at the top of the paper by a chucking mechanism 52 on the transfer drum 51 in order to prevent a shift of position on the image transfer.

FIGS. 2(a) and 2(b) show a block diagram of the control system of the digital color copying machine of FIG. 1. Both image reader 100 and printer 200 are controlled by an image reader controller 101 including a CPU. The controller 101 controls the exposure lamp 12 via a driving I/O interface 103 according to a position signal from a position detection switch 102 which indicates the position of a document on the platen 15 and controls a scan motor driver 105 via the driving I/O interface 103 and a parallel I/O interface 104. The scan motor 11 is driven by the scan motor driver 105.

On the other hand, the image reader controller 101 is connected via a bus to an image controller 106. The image controller 106 is connected to the CCD color image sensor 14 and the image signal processor 20. The image signal from the CCD color image sensor 14 is processed by the image signal processor 20 for outputting print data of yellow, magenta, cyan or black. The image reader controller and the image signal processor 20 are connected to a printer controller 201.

FIG. 2(b) shows a block diagram of printer control system of the printer 200. The printer 200 includes the printer controller 201 including a CPU for controlling the copying action. The printer controller 201 is connected to a control ROM 202 storing a control program and a data ROM 203 storing various data such as the gamma correction tables. The printer controller 201 controls a copying controller 231 and the display panel 232 according to the data from the operational panel 221 and the data ROM 203 under the contents of the control ROM 202.

The printer controller 201 receives analog signals from various sensors which includes the $V_o$ sensor 44 to detect the surface potential of the photoconductor drum 41, the AIDC sensor 210 to detect the amount of adhered toners of the standard toner image, ATDC sensors 211 to detect the toner density in the developers 45a–45d, a temperature sensor 212 and a humidity sensor 213. Various data inputted with the operational panel 221 are sent to the printer controller 201 via a parallel I/O 222.

The printer controller 201 controls the copying controller 231 and the display panel 232 according to the data of the sensors 44, 210–213, the operational panel 221 and the data ROM 203. Further, the printer controller 201 controls via parallel I/O 241 and drive I/O 242 a high voltage ($V_G$) generator 243 for generating the grid voltage $V_G$ of the discharge electrode of the sensitizing charger 43 and a high voltage ($V_B$) generator 244 for generating for the developer bias voltage $V_B$ of the development unit 45a–45d.

The print head controller 202 is connected to the image signal processor 202 of the image reader 100 via an image bus and performs the gamma correction on the image signal received via the image data bus with reference to a gamma correction table stored in the data ROM 203, so as to send image data to a diode laser driver 263 via a drive I/O 261 and a parallel I/O 262, and the laser diode driver 263 controls the emitting of the semiconductor laser 264 according to the image data.

(b) Image Signal Processing

Figure 3:
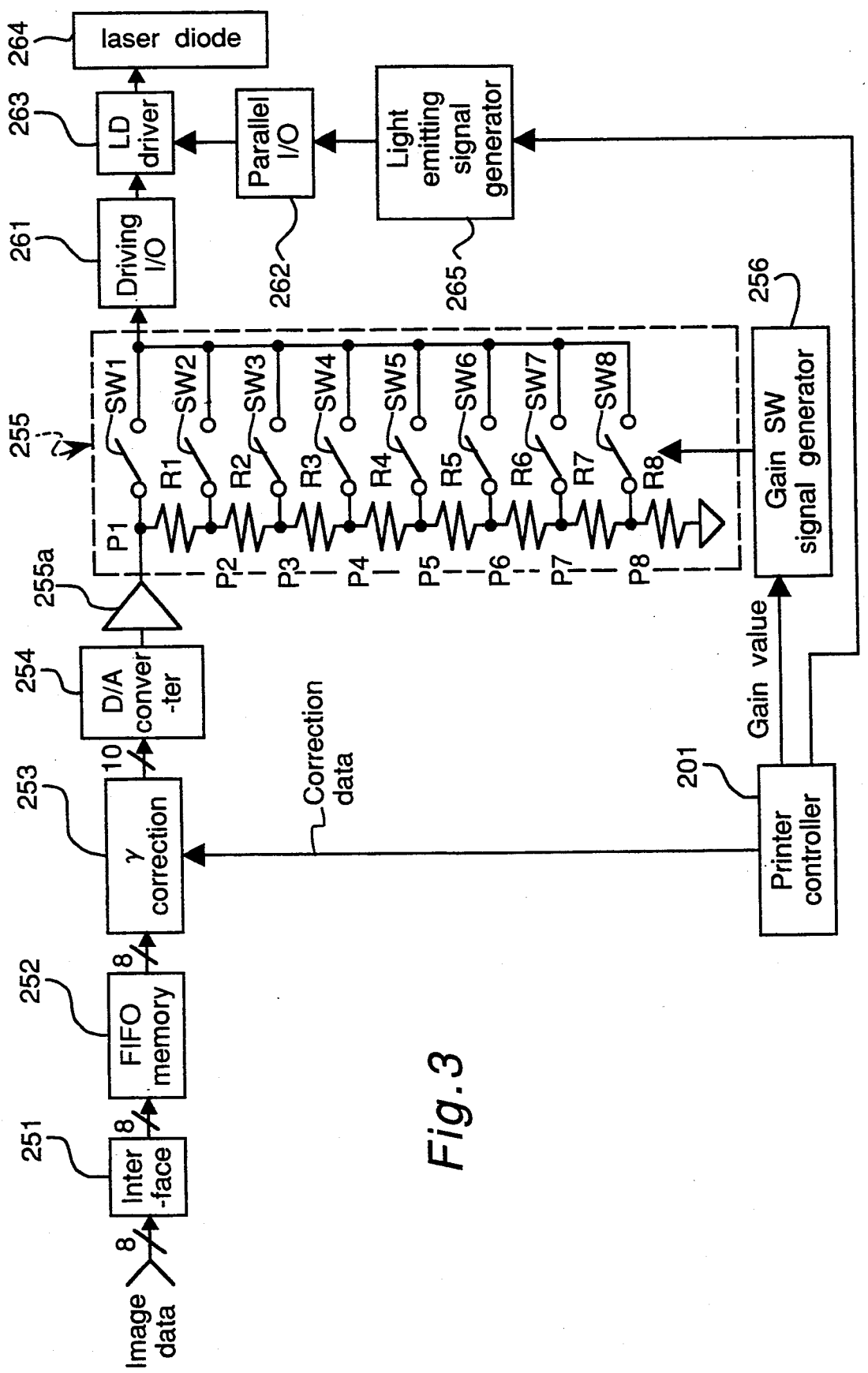
FIG. 3 is a block diagram of an image signal processor in a print controller.

FIG. 3 shows image data processing in the printer controller 201. Multi-level (8-bit) image data are received from the image signal processor 20 through a interface 251 and are stored in a first-in first-out (FIFO) memory 252. The FIFO memory 252 is a line buffer memory and it buffers the difference of the clock frequencies between the image reader 10 and the printer 200. The data in the FIFO memory 252 are inputted to a gamma correction section 253. As will be explained later, gamma correction data in the data ROM 203 are received from the laser exposure controller 220, and the gamma correction section 253 corrects the input data (ID) to send an output level to a D/A converter 254. The D/A converter 254 converts the digital input data to an analog voltage, which is sent through an amplifier 255a, a variable attenuator 255, the drive I/O 261 and the laser diode driver 263 to the laser diode 264 which emits a light of an intensity in correspondence to the digital data. The attenuation in the variable attenuator 255 can be changed at eight steps so as to change the power of the laser beam at eight steps.

On the other hand, the printer controller 201 sends a signal to a light-emitting signal generator 265, which sends a light-emitting signal according to clock signal via a parallel I/O circuit to the laser diode driver 263. The driver 263 provides image signals received from the drive I/O 261 to drive the laser diode 264 only when the light emitting signal is received.

(c) Automatic Image Density Control

Figure 4:
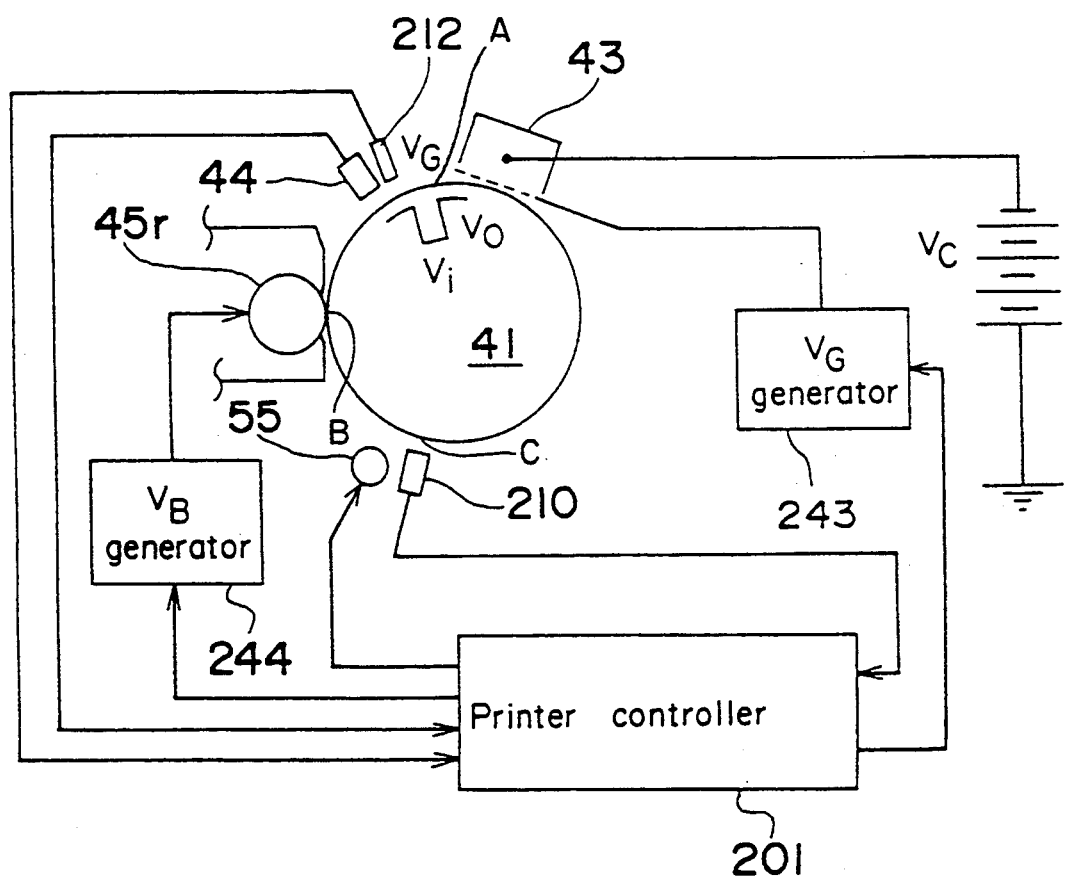
FIG. 4 is a schematic diagram of the image-forming section including a photoconductor drum and a developer.

Automatic image density control is explained below with reference to FIG. 4 of a schematic diagram of image forming section including the photoconductor drum 41 and a roller of the development unit 45r. The sensitizing charger 43 of discharge potential (grid potential) $V_G$ is arranged opposite to the photoconductor 41. The negative grid potential $V_G$ is applied to the grid of the charger 43 by the high voltage generator 243. The surface potential $V_o$ of the photoconductor just after the sensitization before the exposure can be taken almost equal to the grid potential $V_G$. Therefore, the surface potential $V_o$ can be controlled by the grid potential $V_G$, and the surface potential $V_o$ is detected by the $V_o$ sensor 44 which is an electrometer. The $V_o$ sensor 44 is located between the exposure position (A) and the development position (B), while the AIDC sensor 210 is located at a position (C) after the development position. The second eraser 55 is turned off when the toner density is detected with the AIDC sensor 210, in order to prevent the light from the second eraser 55 from entering into the photosensitive section of the AIDC sensor 210. Further, the temperature sensor 212 is also provided near the photoconductor drum 41 to monitor the temperature in the copying machine.

In the electrophotographic process of inversion development system of the present invention, the image reproduction density is controlled automatically according to the surface potential $V_o$ and the development bias voltage $V_B$. In this embodiment, the surface potential $V_o$ is controlled by the grid potential $V_G$. However, it may be controlled by other means.

In the image forming, before the exposure of laser beam, a negative surface potential $V_o$ is first applied to the photoconductor drum 41 by the sensitizing charger 43, while a negative, lower bias voltage $V_B$ ($|V_B| < |V_o|$) is applied to the roller of the development unit 45r by the development bias potential generator 244. That is, the surface potential of the development sleeve is $V_B$.

A laser beam exposes the photoconductor, and the potential at the exposure position decreases from the surface potential $V_o$ to an attenuation potential $V_I$ of the electrostatic latent image or the surface potential just after the laser exposure. If the attenuation potential $V_I$ becomes lower than the development bias potential $V_B$, the toners carried to the surface of the sleeve of the development unit 45r adhere to the photoconductor drum 41. It is not good that the difference between the surface potential $V_o$ and the development bias potential $V_B$ is too large or too small. The adhered amount of toners increases with increasing the development voltage $\Delta V = |V_B - V_I|$. On the other hand, the attenuation potential $V_I$ changes with the surface potential $V_o$ even at the same quantity of light for exposure. Then, for example, the surface potential $V_o$ and the development bias potential $V_B$ are changed by keeping the difference between the surface potential $V_o$ and the development bias potential $V_B$ constant. Then, the difference between the development bias potential $V_B$ and the attenuation potential $V_I$ changes or the adhered amount of toners can be changed to control the density.

Automatic image density control is carried out before the above-mentioned image-forming of a document image. In the automatic image density control, a latent image is formed with a standard quantity of light at a prescribed portion in a photoconductor which has been sensitized at an object surface potential, and the latent image is developed with toners to form a standard toner image. (The image-forming conditions of the toner image are adjusted as will be explained later in detail in section (d).) The amount of the adhered toners of the toner image is detected with the AIDC sensor 210 optically by detecting the reflection light from the toner image. The value detected by the AIDC sensor 210 is received by the printer controller 201, which uses it as a basis of the density control of the photoconductor drum 41. That is, if the grid potential $V_G$ of the sensitizing charger 43 and the development bias potential $V_B$ of the development unit 45 are changed according to the detection value of the AIDC sensor 210, the amount of adhered toners at the highest density level can be kept constant. Thus, even if the attenuation characteristic of the charge amount of toners varies with the sensitivity of photoconductor, relative sensitivity or the like, the maximum density can be kept constant automatically by changing $V_G$ and $V_B$.

TABLE 1

| density detection level | AIDC table | | | gamma table No. |
|---|---|---|---|---|
| | Output signal of AIDC sensor (V) | Grid potential $V_G$ (V) | Bias potential $V_B$ (V) | |
| 0 | 2.91≦ | −400 | −220 | 1 |
| 1 | 2.9–2.81 | −440 | −260 | 2 |
| 2 | 2.8–2.71 | −480 | −300 | 3 |
| 3 | 2.7–2.61 | −520 | −340 | 4 |
| 4 | 2.6–2.51 | −560 | −380 | 5 |
| 5 | 2.5–2.41 | −600 | −420 | 6 |
| 6 | 2.4–2.31 | −640 | −460 | 7 |
| 7 | 2.3–2.21 | −680 | −500 | 8 |
| 8 | 2.2–2.11 | −720 | −540 | 9 |
| 9 | 2.1–2.01 | −760 | −580 | 10 |
| 10 | 2.0–1.91 | −800 | −620 | 11 |
| 11 | 1.9–1.81 | −840 | −660 | 12 |
| 12 | 1.8–1.71 | −880 | −700 | 13 |
| 13 | 1.7–1.61 | −920 | −740 | 14 |
| 14 | 1.6–1.51 | −960 | −780 | 15 |
| 15 | 1.5≧ | −1000 | −820 | 16 |

In this embodiment, a $V_B$ value is selected in correspondence to a $V_G$ value, and a set of $V_G$ and $V_B$ is changed in correspondence to density detection level (LBA) 0–15 determined according to the detection value $V_s$ of the AIDC sensor 210. Table 1 shows an example of an AIDC table on the data of sets of grid potential $V_G$ and the development bias voltage $V_B$. In Table 1, the detection value of the AIDC sensor 210 measured on a standard toner image is classified into density detection level 0–15 shown in the left-most column. Though the development voltage $V_s$ is negative in this embodiment, it is expressed as absolute value for simplicity. The development bias voltage $V_B$ varies with the density detection level and it increases from 220 (level 0) with an increase by 20 V for each step up to 820 V (level 15). The grid potential $V_G$ is kept larger than the development bias voltage $V_B$ by 180 V, or it varies from 400 to 1000 V. The amount of the step of the change of $V_B$ and $V_G$ can be determined according to the precision of the automatic image density control.

Figure 5C:
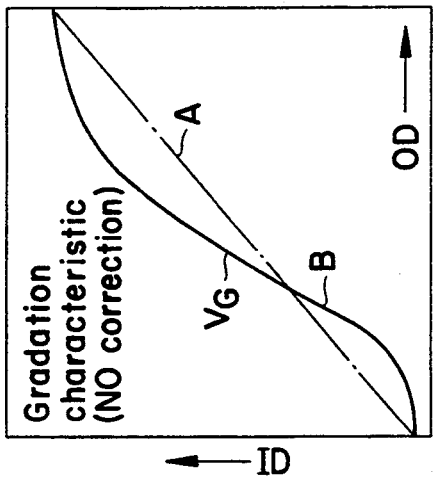
FIGS. 5(a)–5(e) are graphs of the sensitometry of the copying machine, common variables being shown along adjacent, parallel axes of the graphs.
Figure 5E:
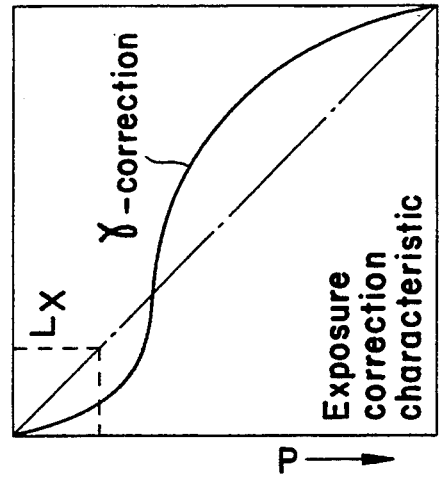
Figure 5B:
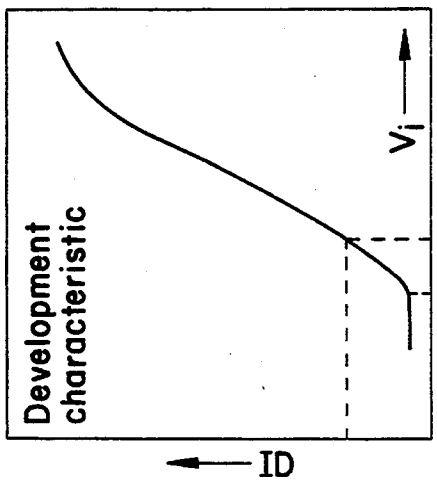

As to a half-tone image, the gradation characteristic has to be taken into account. In general, many factors such as photosensitive characteristic of photoconductor, toner characteristic and environment makes the light emitting level of the laser diode or the image density level (ID) of the reproduced image nonlinear against the read density level (OD) of a document to be reproduced. FIGS. 5(a)–5(e) illustrate the interrelationship of various characteristics affecting the gradation characteristic. FIGS. 5(a) and 5(b), respectively, illustrate the AIDC sensor characteristic, i.e., the relationship between image density and the output of the AIDC sensor, and the development characteristic, i.e., the relationship between image density and potential of the latent image. Thus, as shown in FIG. 5(c), the reproduced characteristic (A) of the image density (ID) plotted against the read density level (OD) is not proportional or it deviated from the ideal linear characteristic (B). This characteristic is called a gradation characteristic, and this deteriorates the fidelity of a reproduced image largely. Therefore, the gamma correction section 253 changes the output power of the laser diode 264 as shown in FIG. 5(e), in order to realize the linear characteristic (A). That is, the output power is increased at low gradations, while it is decreased at high gradations.

Then, a gamma table used by the gamma correction section 253 for converting the receive image data to light-emitting level of the diode laser 264 is also selected according to the density detection level in order to reproduce a half-tone image with fidelity.

Figure 5D:
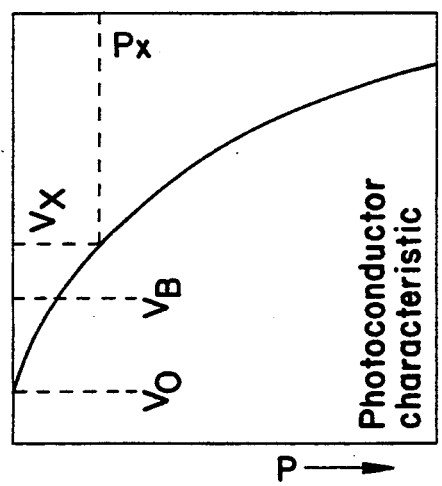
Figure 5A:
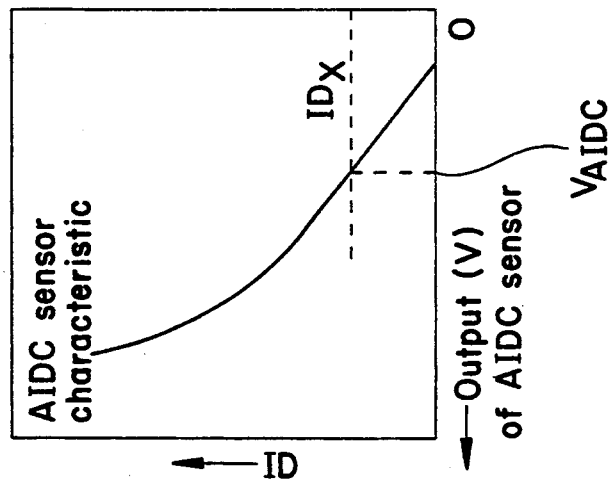

Further, as shown in the photoconductor characteristic at FIG. 5(d), the surface potential $V_o$ after exposure, i.e., the attenuation potential $V_I$, changes nonlinearly with the output power P of the laser diode 264. Further, the amount of toners adhering to the photoconductor if the attenuation potential $V_I$ is smaller than $V_B$ also changes nonlinearly with the output voltage of the AIDC sensor 210.

FIG. 6 shows a schematic graph of the potentials at each density detection level 0-15, wherein the density detection level is attached to $V_G$, $V_o$ and $V_B$ as a subscript and $V_I$ denotes the attenuation potential at the maximum quantity of light. The curves describe a change of potential when a dot is irradiated at the maximum quantity of exposure light.

Figure 7:
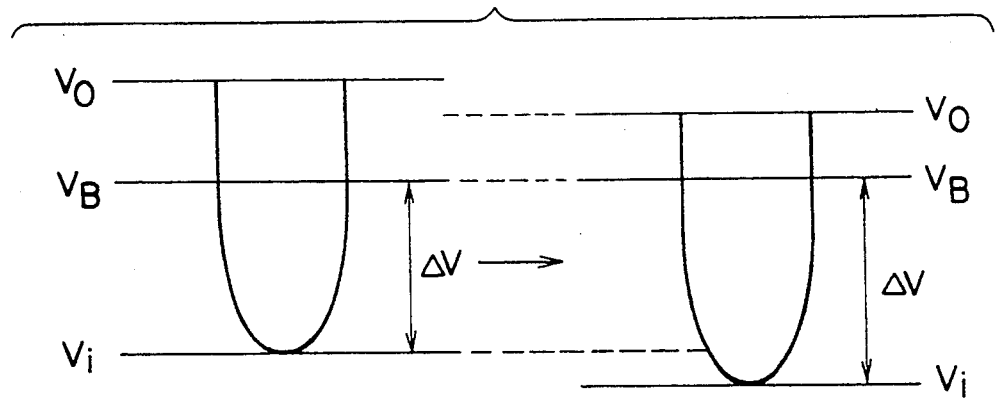
FIG. 7 is a diagram for showing the effect of surface potential on the development voltage.
Figure 8:
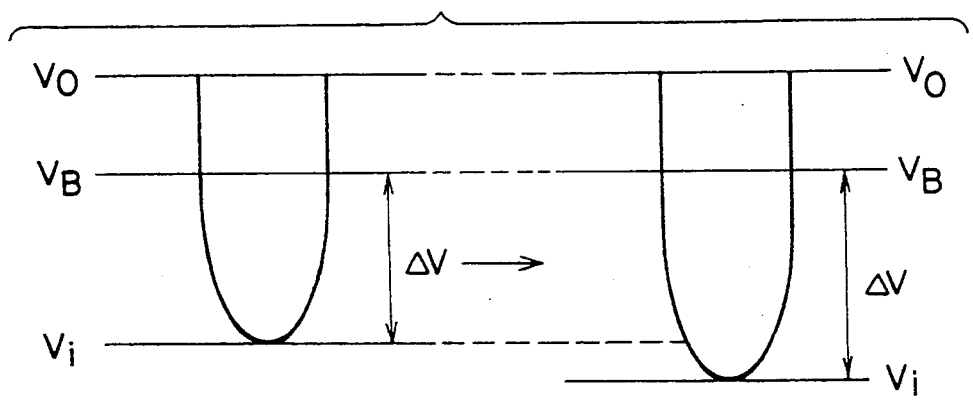
FIG. 8 is a diagram for showing the effect of the potential of electrostatic latent image on the development voltage.
Figure 9:
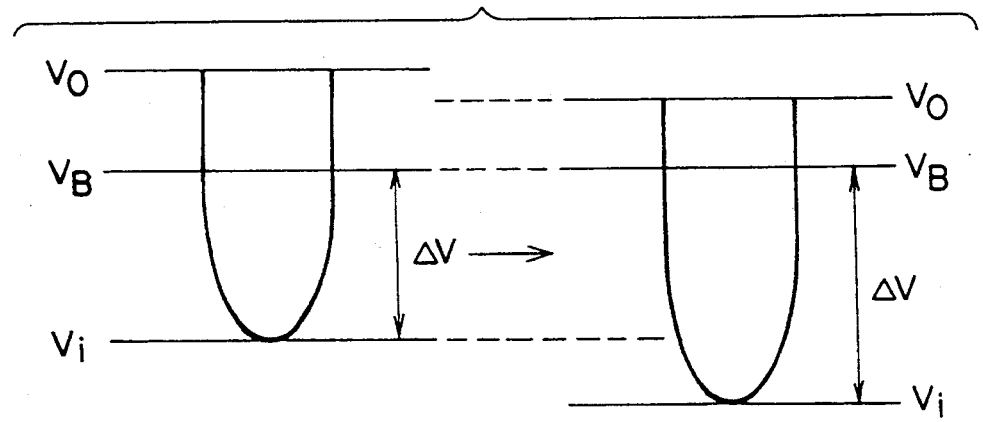
FIG. 9 is a diagram for showing the effect of surface potential and the potential of electrostatic latent image on the development voltage.

(d) Correction of the Sensitizing Potential and the Maximum Quantity of Light Before Automatic Image Density Control As described in section (c), in the automatic image density control, a standard toner image is formed by using standard ($V_G$, $V_B$) and a standard quantity of light, and the amount of toners of the toner image is measured with the AIDC sensor 210. Then, $V_G$ and $V_B$ used for copying a document image are changed according to the detected amount of toners. However, the surface potential $V_o$ in correspondence to $V_G$ vary for example with the sensitivity change due to environment or the like or with the dirtiness of the sensitizing charger. Therefore, the development voltage $|V_B - V_i|$ changes even under the same $V_G$, $V_B$ and the quantity of light, and the amount of adhered toners is also changed (refer FIG. 7), where $V_i$ denotes a potential of a latent image. Further, $V_i$ also varies with the sensitivity change of photoconductor due to environment, wear and the like. Therefore, the development voltage $|V_B-V_i|$ changes even under the same $V_G$, $V_B$ and the quantity of light, and the amount of adhered toners is also changed (refer FIG. 8). If both $V_o$ and $V_i$ vary, $|V_B-V_i|$ and the amount of adhered toners are also changed (refer FIG. 9).

In other words, the amount of adhered toners of the standard toner image cannot be detected under the same $|V_B-V_i|$ which is a prerequisite of the automatic image density control, and this decreases the precision of the automatic image density control. Then, in order to perform the automatic image density control precisely, it is needed to keep the potentials $V_o$ and $V_i$ for forming the standard toner image constant under any conditions. Then, in this embodiment, the potentials $V_o$ and $V_i$ are detected before the automatic image density control and $V_G$ and the maximum quantity of light are corrected so as to increase the precision of the automatic image density control.

(d-1) Correction of Potential Before Exposure

Figure 10:
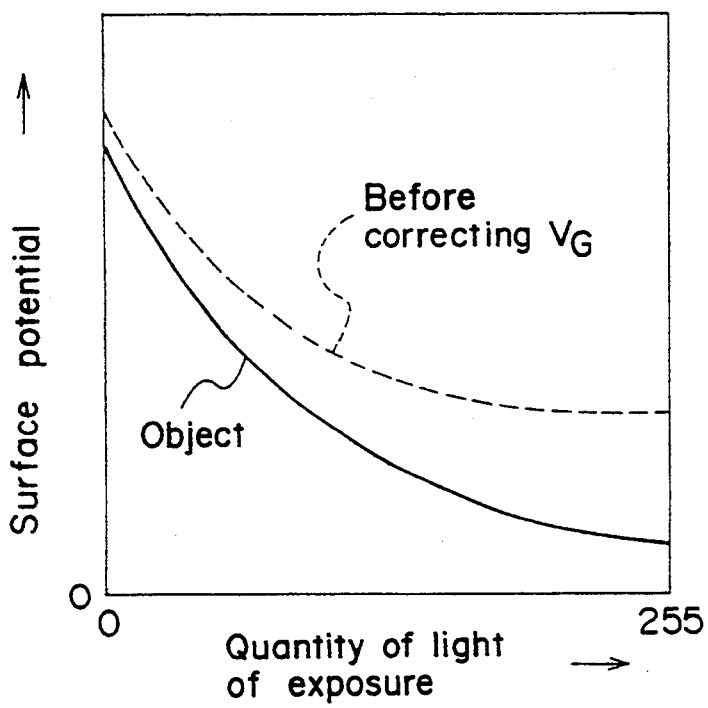
FIG. 10 is a diagram of a characteristic before correcting $V_G$.

First, the potential $V_o$ of the photoconductor sensitized by the sensitizing charger 43 with the prescribed $V_G$ of $-780$ V is measured with the $V_o$ sensor 44 before exposure for the detection of the density of the standard toner density. FIG. 10 shows an example of a situation before the automatic image density control wherein the curve of the surface potential $V_o$ plotted against the quantity of exposure light deviates from an object curve.

Figure 12:
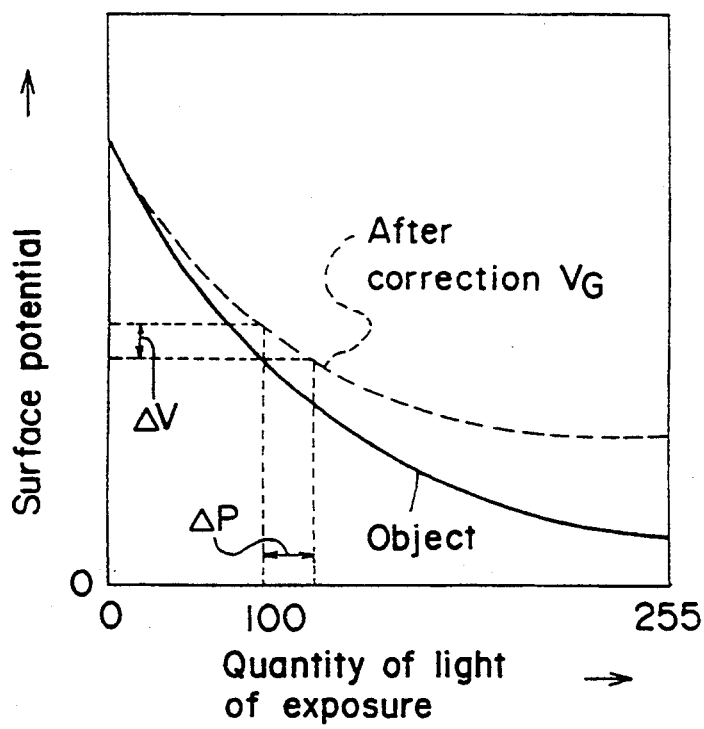
FIG. 12 is a diagram of the relation of the detected value against the quantity of light.
Figure 11:
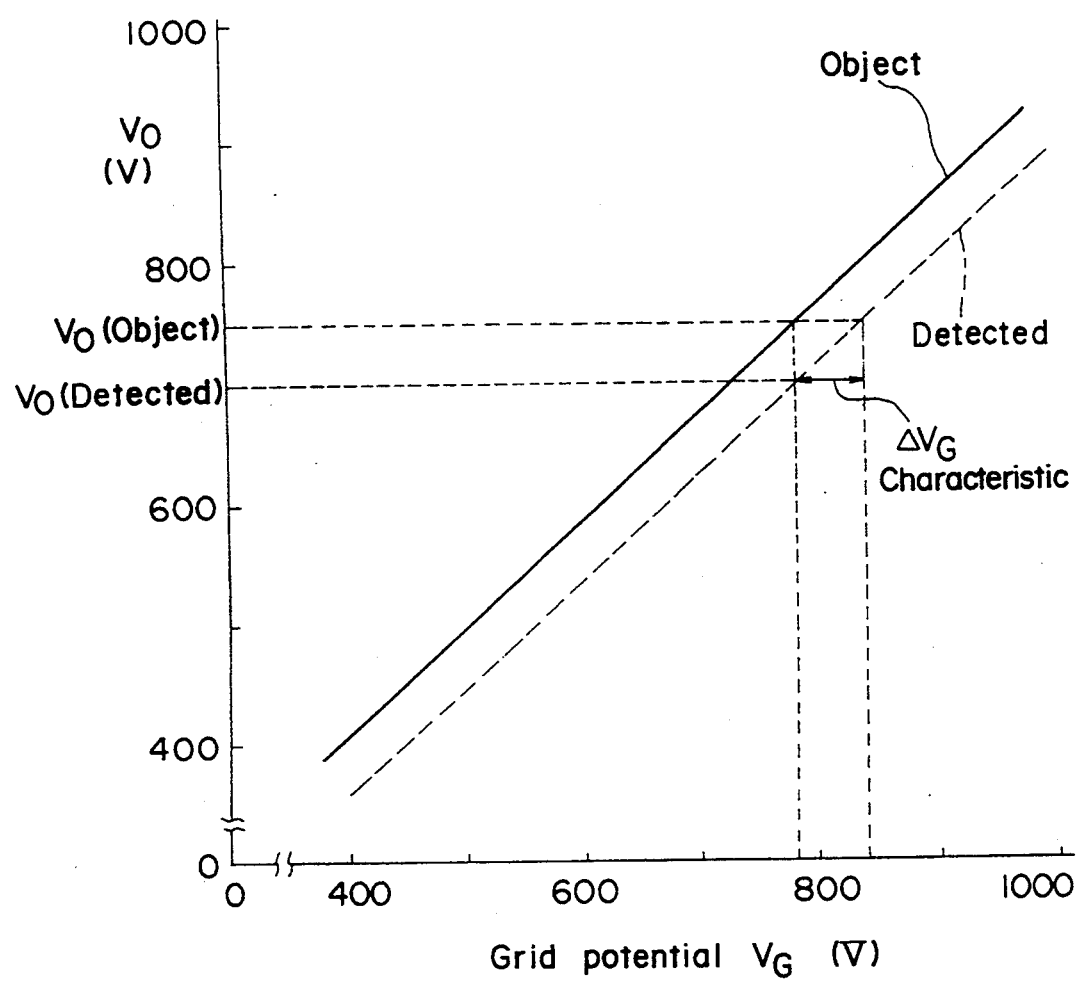
FIG. 11 is a diagram on the relation of the detected characteristic against an object characteristic.

It is decided with the measured surface potential how much the surface potential $V_o$ deviates from the object curve, and a correction amount of the grid potential $V_G$ is determined based on Table 2 ($V_G$ correction table) shown below (refer a flow of FIG. 16). In the range of $V_G$ used in the embodiment (400-1000 V), the $V_G$-$V_o$ characteristic usually shifts with the same slope as shown in FIG. 11. The correction amount of $V_G$ shown in Table 2 is determined on the basis of this change of the characteristic. That is, the $V_G$ correction amount ($\Delta V_G$) shown in Table 2 is determined according to the difference between the measured surface potential $V_o$ and the object value (780 V) by assuming that the slope is the same. Thus, the surface potential $V_o$ before exposure can be corrected to have the object value, as shown in FIG. 12.

TABLE 2

$V_G$ correction table

| $\Delta V_G$ | Output of $V_o$ sensor | Surface potential at development position (V) | Surface potential at sensor position (V) |
|---|---|---|---|
| +100 | ≦3.54 | ≦659 | ≦709 |
| +80 | 3.55-3.64 | 660-679 | 710-729 |
| +60 | 3.65-3.74 | 680-699 | 730-749 |
| +40 | 3.75-3.84 | 700-719 | 750-769 |
| +20 | 3.85-3.94 | 720-739 | 770-789 |
| 0 | 3.95-4.04 | 740-759 | 790-809 |
| -20 | 4.05-4.14 | 760-779 | 810-829 |
| -40 | 4.15-4.24 | 780-799 | 830-849 |
| -60 | 4.25-4.34 | 800-819 | 850-869 |
| -80 | 4.35-4.44 | 820-839 | 870-889 |
| -100 | 4.45≦ | 840≦ | 890≦ |

(d-2) Correction of Maximum Quantity of Light

Figure 13:
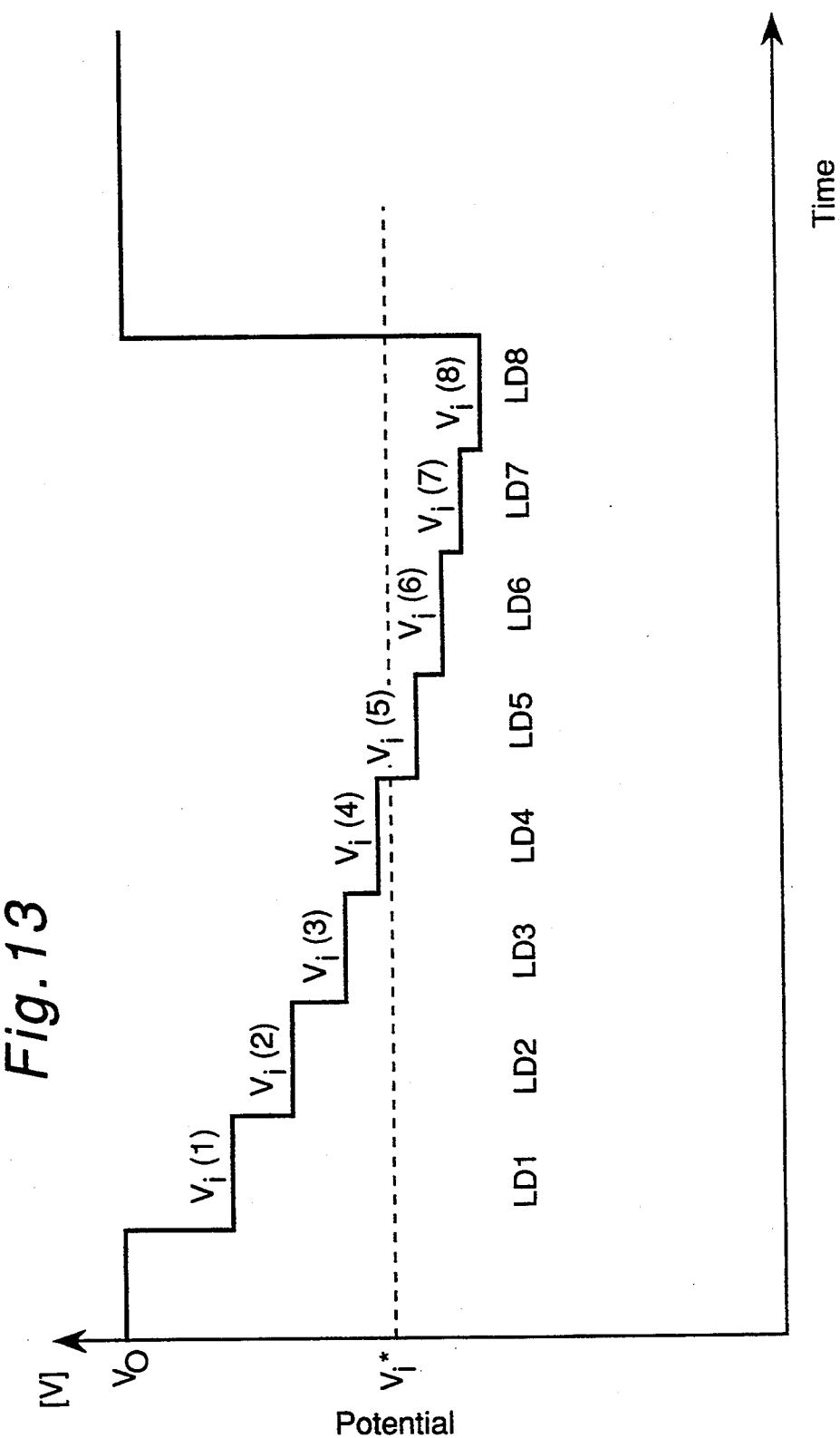
FIG. 13 is a timing chart on the detection of surface potential for correcting quantity of light.

As shown in FIG. 13, after the grid potential $V_G$ is corrected to realize the object value of the surface potential $V_o$, the photoconductor drum 41 is irradiated at a plurality of quantities of light, and the attenuated surface potentials $V_i$ of the obtained latent images are measured with the $V_o$ sensor 44. Then, a table on the relation between the quantity of light and the potential $V_i$ is obtained, and a quantity of light is determined according to the table so as to realize the object value of the potential $V_i$ (refer FIGS. 17(a) and 17(b)). The plurality of quantities of light are determined to agree to those of level 64 for the maximum level 255 (or a fourth thereof) which corresponds to 0.80-1.50 mW/cm$_2$ at eight steps of the maximum quantity of light in Table 3. That is, the light of 0.20 (LD1), 0.23 (LD2), 0.25 (LD3), 0.28 (LD4), 0.30 (LD5), 0.33 (LD6), 0.35 (LD7) and 0.38 (LD8) mW/cm$_2$ are irradiated on the photoconductor drum 41 successively, and each of the quantities of light is irradiated in the same time. The attenuated surface potential $V_i(N)$ (N=1-8) is measured with the $V_o$ sensor 44 for each of the irradiated latent image patterns. Thus, a table on the light-emitting number "N" and the detected potential $V_i(N)$ as shown in Table 4 is prepared.

Figure 14:
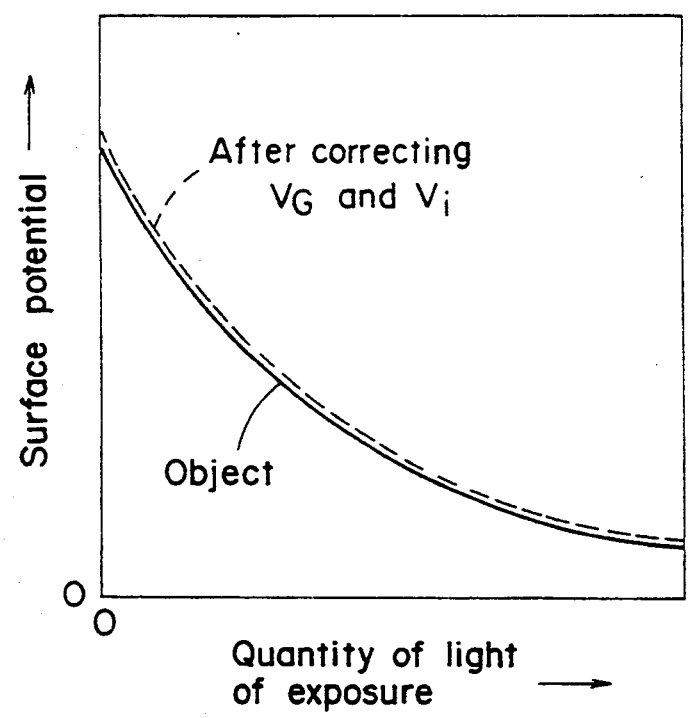
FIG. 14 is a diagram of a characteristic after correcting $V_G$ and quantity of light.

Next, $V_i(N)$'s of Table 4 are compared with the object value $V_i^*$ successively, and the number N* in correspondence to the smallest difference $\Delta V_i = |V_i^* - V_i(N)|$ is determined among the light-emitting numbers N, and the quantity of light is set as that of level 255 in correspondence to the N*. Thus, as shown in FIG. 14, the exposure characteristic LDC can be set to agree almost with the object curve.

Next, the automatic image density control explained above in the section (c) is carried out to control the image-forming conditions for forming an image of a document. That is, the standard toner image is formed by sensitizing the photoconductor with the corrected grid potential and quantity of light and by irradiating the photoconductor at the prescribed half-tone light-emitting level for the selected light-emitting number N* (refer FIG. 18).

The above-mentioned adjustment for image stabilization can be performed for each copy. On the other hand, the number of the processing of the image stabilization can be decreased by performing the processing at intervals of a prescribed number of copies or at intervals of a prescribed time according to the number of copies and the time counted, respectively, or when a certain amount of environment change of humidity or the like is observed with sensors. This can improve the life of the photoconductor drum, the development material or the like.

TABLE 3

Laser power table

| No. | Maximum quantity of light (level 255) (mW/cm$^2$) |
|---|---|
| 1 | 0.80 |
| 2 | 0.90 |
| 3 | 1.00 |
| 4 | 1.10 |
| 5 | 1.20 |
| 6 | 1.30 |
| 7 | 1.40 |
| 8 | 1.50 |

TABLE 4

Table of light-emitting number vs. detected surface potential

| Light emitting number (N) | Detected potential $V_i$ (N) |
|---|---|
| 1 | $V_i(1)$ |
| 2 | $V_i(2)$ |
| 3 | $V_i(3)$ |
| 4 | $V_i(4)$ |
| 5 | $V_i(5)$ |
| 6 | $V_i(6)$ |
| 7 | $V_i(7)$ |
| 8 | $V_i(8)$ |

In a modified embodiment, after storing the relation of the detected potential $V_i(N)$ against the light-emitting number "N" (Table 4) in a memory, the same table can be used for the correction of quantity of light in the subsequent image-forming for copies, and this can shorten the time needed to start the first copy. In this embodiment, the surface potential is detected at the plurality of quantities of light only when the electric power of the copying machine is turned on, and then the surface potential is detected only for a single quantity of light, and the quantity of light is corrected by using the only data. That is, the correction of $V_G$ is performed as explained in the section (d-1) when the electric power is turned on; then, a latent image pattern is formed with only a quantity of light for the light-emitting number N* determined in the first processing, and the surface potential $V_i$ of the only latent image pattern is detected with the $V_o$ sensor 44.

Then, the light-emitting number is determined so as to correspond with the detection potential $V_i(N)$ nearest to the detected value $V_i$. Then, a difference $\Delta N = N^* - N$ is obtained If $N < N^*$, the quantity of exposure light is larger or the detected potential is smaller. Then, the light-emitting number N is decreased by $\Delta N$ to decrease the quantity of light. On the other hand, if $N > N^*$, the quantity of light is smaller or the detected potential is larger. Then, the light-emitting number N is increased by $\Delta N$ to increase the quantity of exposure light. After the above-mentioned determination of the maximum quantity of light, the automatic image density control and the copy operation are carried out.

(e) Flow of Printer Control

Figure 15:
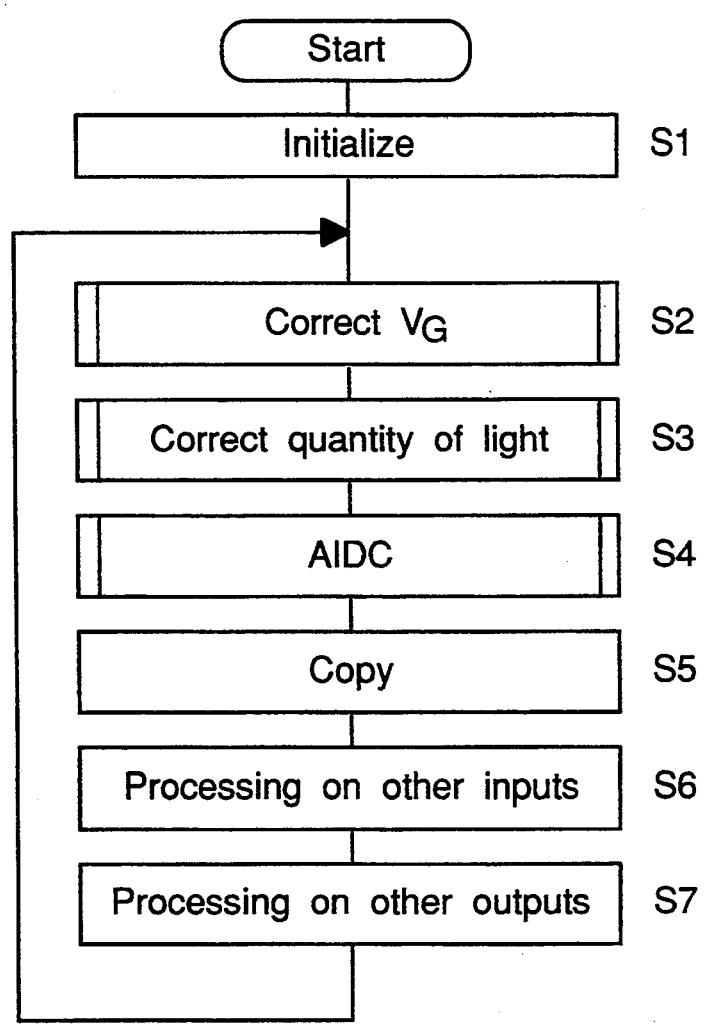
FIG. 15 is a flowchart of copy control.

FIG. 15 shows a control flow of the printer controller 201. At step S1, the initialization of the printer controller 201 is performed for internal registers, timers and the like. The, the data on the grid potential $V_G$ to be supplied to the high voltage generator 243 is corrected (step S2, refer FIG. 16), the quantity of light is corrected by providing a gain value to the signal generator 256 (step S3, refer FIGS. 17(a) and 17(b)). Then, at step S4, AIDC processing is performed (refer FIG. 18) and at step S5, copy action is performed. Further, the processings of other inputs and outputs are performed successively (steps S5 and S6). Then, the flow returns to step S2, to repeat the abovementioned main flow. The explanation of the copy action (step S5) is omitted because an ordinary electrophotographic process is used by using the selected grid potential $V_G$, the selected development bias potential $V_B$ and the selected gamma correction table.

(e-1) Correction of Grid Potential $V_G$

Figure 16:
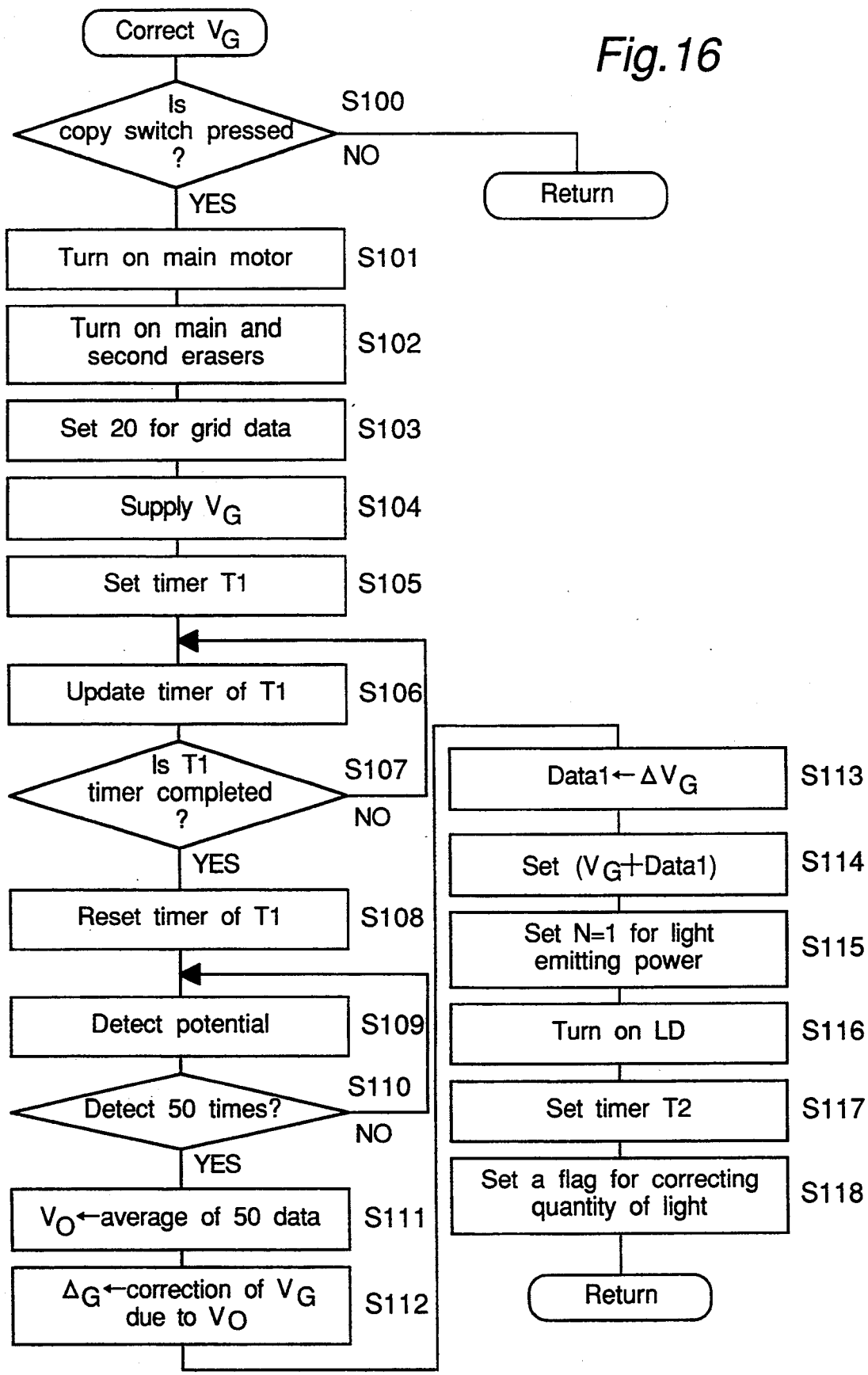
FIG. 16 is a flowchart of a processing of correcting $V_G$.

FIG. 16 shows a flow of the correction of the grid potential $V_G$ (step S2 in FIG. 15). First at step S100, it is decided if a copy switch (not shown) in the operation panel 221 is pressed or not. If the copy switch is decided not to be pressed, the flow returns to the main flow, otherwise, copy operation is started. That is, the main motor (not shown) is driven to rotate the photoconductor drum 41 (step S101), and the eraser lamp 42 and the secondary eraser 55 located before the transfer position are turned on for erasing (step S102). Further, a prescribed data of grid potential $V_G$ for driving the sensitizing charger 43 is set (step S103), and the $V_G$ generator 243 is instructed to supply the prescribed $V_G$ to the sensitizing charger 43 (step S104).

Then, a T1 timer which allows the detection of surface potential $V_o$ is started (step S105). The T1 timer is used to count a time needed to stabilize the potential of the photoconductor. Next, the T1 timer is updated by one (step S106) until the T1 timer is decided to be completed (YES at step S107). Then, the T1 timer is reset (step S108).

Next, the potential of the photoconductor or the surface potential in a portion not exposed is detected with the $V_o$ sensor 44 (step S109), and this detection is repeated up to fifty times (step S110). Then, an average of the detected fifty data is calculated, and the average is set as the surface potential $V_o$ before exposure (step S111). Next, a correction amount $\Delta V_G$ of grid potential $V_G$ is calculated according to the detected surface potential $V_o$ by using Table 2 (step S112), and the obtained $\Delta V_G$ is stored in a memory (step S113). Then, the value stored in the memory is added to the grid potential $V_G$ in order to set the new $V_G$ as the standard grid potential (step S114).

Then, the light-emitting number N is set to be one and the first light-emitting power data (LD1) is set (refer Table 3) (step S115). Then, the laser diode 264 is turned on for exposing the sensitized photoconductor (step S116).

Then, a T2 timer is started for allowing the detection of $V_i$ (step S117), and a first flag for correcting the quantity of light is set (step S118), and the flow returns to the main flow.

(e-2) Correction of Quantity of Light ($V_i$)

Figure 17A:
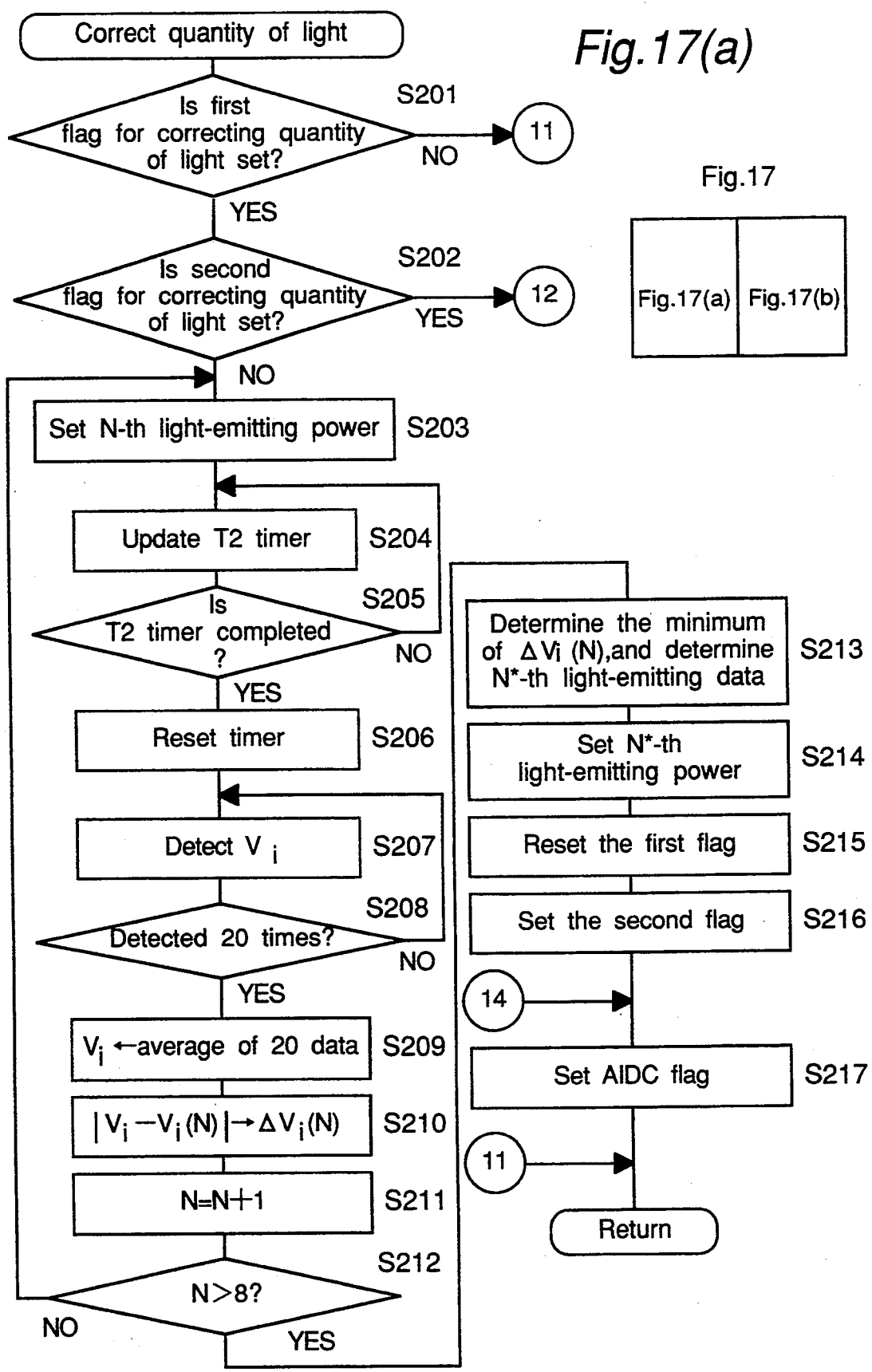
FIGS. 17(a) and 17(b) is a flowchart of a processing of correcting the quantity of light.
Figure 17B:
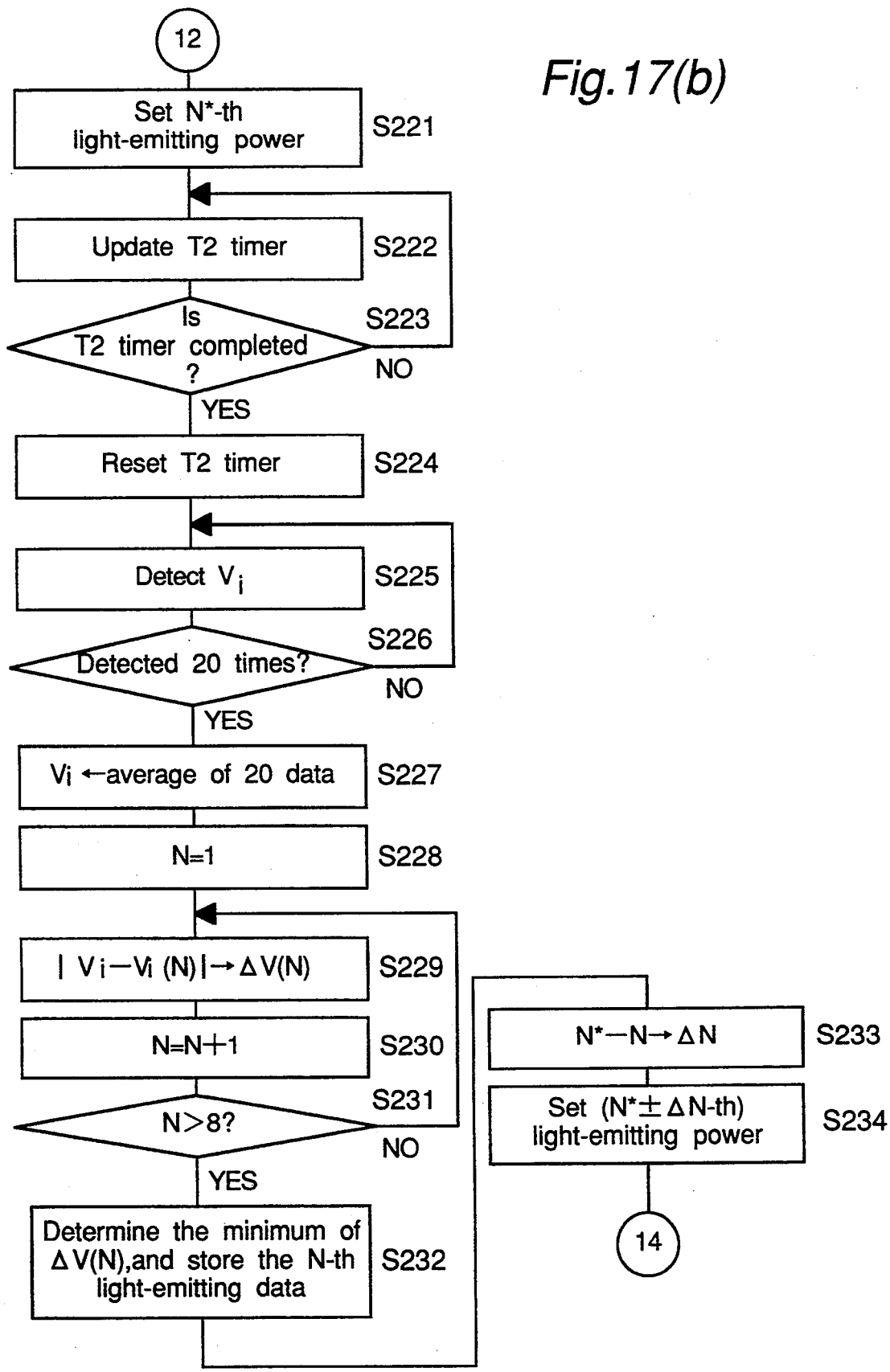

FIGS. 17(a) and 17(b) show a flow of the correction of quantity of light (step S3 in FIG. 15). First, it is decided if the first flag for correcting the quantity of light is set or not (step S201). If the first flag is decided not to be set (refer step S118 in FIG. 16), the flow returns to the main flow. Otherwise it is decided if a second flag for correcting the quantity of light is set or not (step S202).

If the second flag is decided not to be set (NO at step S202), the N-th light-emitting power (LDN) is set (refer Table 3) (step S203). Then, the T2 timer is updated (step S204) until it is decided to be completed (YES at step S205). Then, the T2 timer is reset (step S206). The T2 timer is used to count a time needed for a latent image to reach the position of the $V_o$ sensor 44 after the light-emitting power is changed.

Next, the surface potential of a latent image exposed with an N-th light-emitting power is detected with the $V_o$ sensor 44 (step S207), and this detection is repeated twenty times (YES at step S208). Then, an average of the twenty data is calculated and the average is stored as $V_i(N)$ as shown in Table 4 (step S209). Next, an absolute value of the difference of the detected $V_i(N)$ from the object value $V_i^*$ or $\Delta V_i(N) = |V_i^* - V_i(N)|$ is calculated and stored (step S210). Then, the light-emitting number N is incremented (step S211), and if the light-emitting number N is decided not to be larger than eight (NO at step S212), the flow returns to step S203 to repeat the measurement. If the light-emitting number N is decided to be larger than eight (NO at step S212), the detection of the surface potential at eight steps of quantity of exposure light is completed.

Then, a minimum of $\Delta V_i(N)$ (N=1-8) is determined, and the light-emitting number in correspondence to the minimum is stored as the light-emitting number N* (step S213). Then, the light-emitting power is set in correspondence to the maximum quantity of light for the light-emitting number N* (step S214). Next, the first flag for correcting the quantity of light is reset (step S215), and the second flag for correcting the quantity of light next time is set (step S216).

Then, a flag for allowing the automatic image density control is set (step S217), and the flow returns to the main flow.

The above-mentioned processing relates to the correction of quantity of light when the copy switch is pressed first time after the electric power is turned on. A relation between the light-emitting number N and the detection potential $V_i(N)$ as shown in Table 4 is obtained.

Next, a second type of the correction of the quantity of light is explained. If the second flag for correcting the quantity of light is decided to be set (step S202), the flow proceeds to step S221. First, the N*-th light-emitting power which has been obtained in the previous correction processing (step S213) is set (step S221). The processings from step S221 to S227 are similar to those from step S203 to S209, and detailed explanation thereof are omitted here. However, it is to be noted that the exposure is performed only once for the light-emitting number N* in this case.

Next, the light-emitting number N is initialized to be zero at step S228. Then, an absolute value of a difference between $V_i$ stored at step S227 and $V_i(N)$ obtained in the previous correction processing, and the difference is stored as $\Delta V(N)$ (step S229). Next, the light-emitting number N is incremented by one (step S230) to repeat this calculation until N=8.

If the light-emitting number N becomes larger than eight (YES at step S231), a minimum of $\Delta V_i(N)$ (N=1-8) is determined, and the light-emitting number N in correspondence to the minimum is stored (step S232). That is, this light-emitting number N corresponds with the detection potential $V_i(N)$ nearest to the detected value $V_i$. Then, a difference between the N* obtained previously and the light-emitting number N obtained at present is calculated, and it is stored as $\Delta N$ (step S233). If N<N*, the quantity of light is larger or the detected potential is smaller, and the light-emitting number N is decreased by $\Delta N$ to decrease the quantity of light; on the other hand, if N>N*, the quantity of light is smaller or the detected potential is larger, and the light-emitting number N is increased by $\Delta N$ to increase the quantity of light (step S234). Then, the flow proceeds to step S 217 to set an AIDC flag for allowing the automatic image density control, and the flow returns to the main flow.

(e-3) Automatic Image Density Control

FIG. 18 shows a flow of the automatic image density control (step S4 in FIG. 15). It is decided at step S300 if AIDC flag is set or not. The AIDC flag may be set in the correction of quantity of light (step S217 in FIG. 17(a)). If the AIDC flag is not set, the flow returns readily to the main flow. If the AIDC flag is decided to be set (YES at step S300), the sensitivity of the AIDC sensor 210 is determined first because it is affected by the distance from the photoconductor, the dirtiness of the detection part of the sensor and the like. First, at step S301, the toner density of the photoconductor surface which is not developed with a development material is detected with the AIDC sensor 210. Next, step S302, a latent image is formed under the highest $V_G$ and $V_B$ and the maximum quantity of light, the latent image is developed with a cyan development material, and the deepest density of the cyan toners is detected with the AIDC sensor 210. The detected density level means a level at which the sensor output saturates. The sensor sensitivity can be obtained according to the difference of the two detection values.

Next, at steps S303–S306, the half-tone densities of each color of cyan, magenta, yellow and black, respectively. The photoconductor is sensitized with the grid potential $V_G$ corrected in the $V_G$ correction step S111 in FIG. 16, and it is irradiated at a quantity of light of a prescribed level with use of the maximum quantity of light determined in step S214 or S234 in FIGS. 17(a), 17(b), so as to form a half-tone latent image. The half-tone latent image is developed by using the development bias potential $V_B$ with development material of cyan, magenta, yellow or black. Then, the toner density is measured with the AIDC sensor 210. Next, at step S307, a set of $V_G$, $V_B$ and the gamma correction table is selected according to the AIDC table (Table 1) for each color according to the toner densities detected at steps S303–S306.

Then, the AIDC flag is set at step S308 to means the completion of the determination of the image-forming conditions. Further, the copy flag is set for allowing the copy processing at step S309, and the flow returns to the main flow. Then, in the following copy processing, an image is formed by using the selected image forming condition of a set of $V_G$, $V_B$ and gamma correction table.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus by using electrophotographic process, which image forming apparatus comprising:

a photoconductor whereon an electrostatic latent image can be formed;

a sensitizing charger for sensitizing the photoconductor with a grid potential;

an exposure means for exposing the photoconductor, which has been sensitized by the sensitizing charger, to form an electrostatic latent image on the photoconductor;

a developing unit for developing the electrostatic latent image formed on the photoconductor with a development material including toners;

a sensor for detecting a surface potential of the photoconductor;

a first correction means for correcting the grid potential of the sensitizing charger by using a surface potential detected by the sensor on the photoconductor which has been sensitized by the sensitizing charger with a prescribed grid potential so that the photoconductor is sensitized at a prescribed surface potential;

a control means for controlling the exposure means to expose the photoconductor, which has been sensitized by the sensitizing charger with the grid potential corrected by the first correction means, with quantities of light different from each other so that a plurality of electrostatic latent image patterns are formed on the photoconductor;

a table generation means for generating a table based upon a relation of the surface potential with the quantity of light from data on the surface potentials of the plurality of electrostatic latent image patterns detected by the sensor; and a second correction means for correcting the quantity of light of the exposure means according to the table generated by the table generation means so that the surface potential of the exposed photoconductor has a desired value;

whereby a standard toner image for detecting toner density thereof is formed with the grid potential of the sensitizing charger corrected by the first correction means and with the quantity of light corrected by the second correction means.

2. The image forming apparatus according to claim 1, wherein said first correction means corrects the grid potential by using a predetermined relation between the grid potential and the surface potential.

3. The image forming apparatus according to claim 1, wherein said first correction means comprises a table on the surface potential detected by the sensor on the sensitized photoconductor sensitized with the prescribed grid potential and a correction amount of the grid potential.

4. An image forming apparatus by using electrophotographic process, which image forming apparatus comprising:

a photoconductor whereon an electrostatic latent image can be formed;

a sensitizing charger for sensitizing the photoconductor by using a grid potential;

an exposure means for exposing the photoconductor, which has been sensitized by the sensitizing charger, to form an electrostatic latent image on the photoconductor;

a developing unit for developing the electrostatic latent image formed on an the photoconductor with a development material including toners;

a sensor for detecting a surface potential of the photoconductor;

a first correction means for correcting the grid potential of the sensitizing charger by using a surface potential detected by the sensor on the photoconductor which has been sensitized by the sensitizing charger with a prescribed grid potential so that the photoconductor is sensitized at a prescribed surface potential;

a control means for controlling the exposure means to expose the photoconductor, which has been sensitized by the sensitizing charger with the grid potential corrected by the first correction means, with quantities of light different from each other so that a plurality of electrostatic latent image patterns are formed on the photoconductor; and a selection means for selecting a quantity of light which corresponds most closely to a desired surface potential among the surface potentials of the plurality of latent image patterns formed by the control means and detected by the sensor;

whereby a standard toner image for detecting a toner density thereof is formed with the grid potential of the sensitizing charger corrected by the first correction means and with the quantity of light selected by the selection means.

5. The image forming apparatus according to claim 4, further comprising:

a table generation means for generating a table based upon a relation of the surface potential with the quantity of light from the surface potentials of the plurality of electrostatic latent image patterns detected by the sensor; and a second correction means for correcting a quantity of light by detecting the surface potential of said photoconductor exposed with the quantity of light corrected by said first correction means by using the table generated by the table generation means and the detected surface potential.

6. The image forming apparatus according to claim 5, wherein said table generation means generates the table only when an electric power source of the apparatus is turned on.

7. The image forming apparatus according to claim 5, further comprising a counter for counting a number of copies;

wherein said table generation means generates the table for each time the counter counts a prescribed number of copies.

8. The image forming apparatus according to claim 4, wherein said first correction means corrects the grid potential by using a predetermined relation between the grid potential and the surface potential.

9. The image forming apparatus according to claim 4, wherein said first correction means comprises a table on the surface potential detected by the sensor on the sensitized photoconductor sensitized with the prescribed grid potential and a correction amount of the grid potential.

10. A method for stabilizing an image for an image forming apparatus by using electrophotographic process, which method comprises the steps of:
   detecting a surface potential of a photoconductor which has been sensitized with a grid potential by a sensitizing charger;
   correcting the grid potential of the sensitizing charger according to the detected surface potential by using a pre-determined relation of the surface potential and the grid potential so that the photoconductor is sensitized at a prescribed surface potential;
   exposing the photoconductor, which has been sensitized with the corrected grid potential by the sensitizing charger, with a plurality of quantities of light to form a plurality of latent image patterns on the photoconductor;
   detecting surface potentials of the plurality of latent image patterns;
   determining a relation of the detected surface potentials with the quantity of light; and
   setting a quantity of light by using the relation.

11. The method according to claim 10, further comprising the steps of:
   forming a standard toner image by using the corrected grid potential and the set quantity of light for exposure and detecting a toner density of the standard toner image; and
   setting image-forming conditions according to the detected toner density.

12. A method for stabilizing an image for an image forming apparatus by using electrophotographic process, which method comprising the steps of:
   detecting a surface potential of a photoconductor which has been sensitized with a grid potential by a sensitizing charger;
   correcting the grid potential of the sensitizing charger according to the detected surface potential by using a pre-determined relation of the surface potential and the grid potential so that the photoconductor is sensitized at a prescribed surface potential;
   exposing the photoconductor, which has been sensitized with the corrected grid potential by the sensitizing charger, with a plurality of quantities of light to form a plurality of latent image patterns on the photoconductor;
   detecting surface potentials of the plurality of latent image patterns with a detector; and
   selecting the quantity of light in correspondence to one of the surface potentials which is nearest to the prescribed surface potential.

13. The method according to claim 12, further comprising the steps of:
   generating a table based upon a relation of the surface potential with the quantity of light from the surface potentials of the plurality of latent image patterns detected by the detector; and
   correcting a quantity of light by detecting the surface potential of said photoconductor exposed with the selected quantity of light by using the table and the detected surface potential.

14. The method according to claim 13, wherein said table is generated only when an electric power source of the image forming apparatus is turned on.

15. The method according to claim 12, further comprising the steps of:
   forming a standard toner image by using the corrected grid potential and the selected quantity of light for exposure and detecting a toner density of the standard toner image; and
   setting image-forming conditions according to the detected toner density.

* * * * *